Dec. 5, 1950     F. D. BOYDEN     2,533,162
SPINDLE BRAKE
Filed Sept. 1, 1949
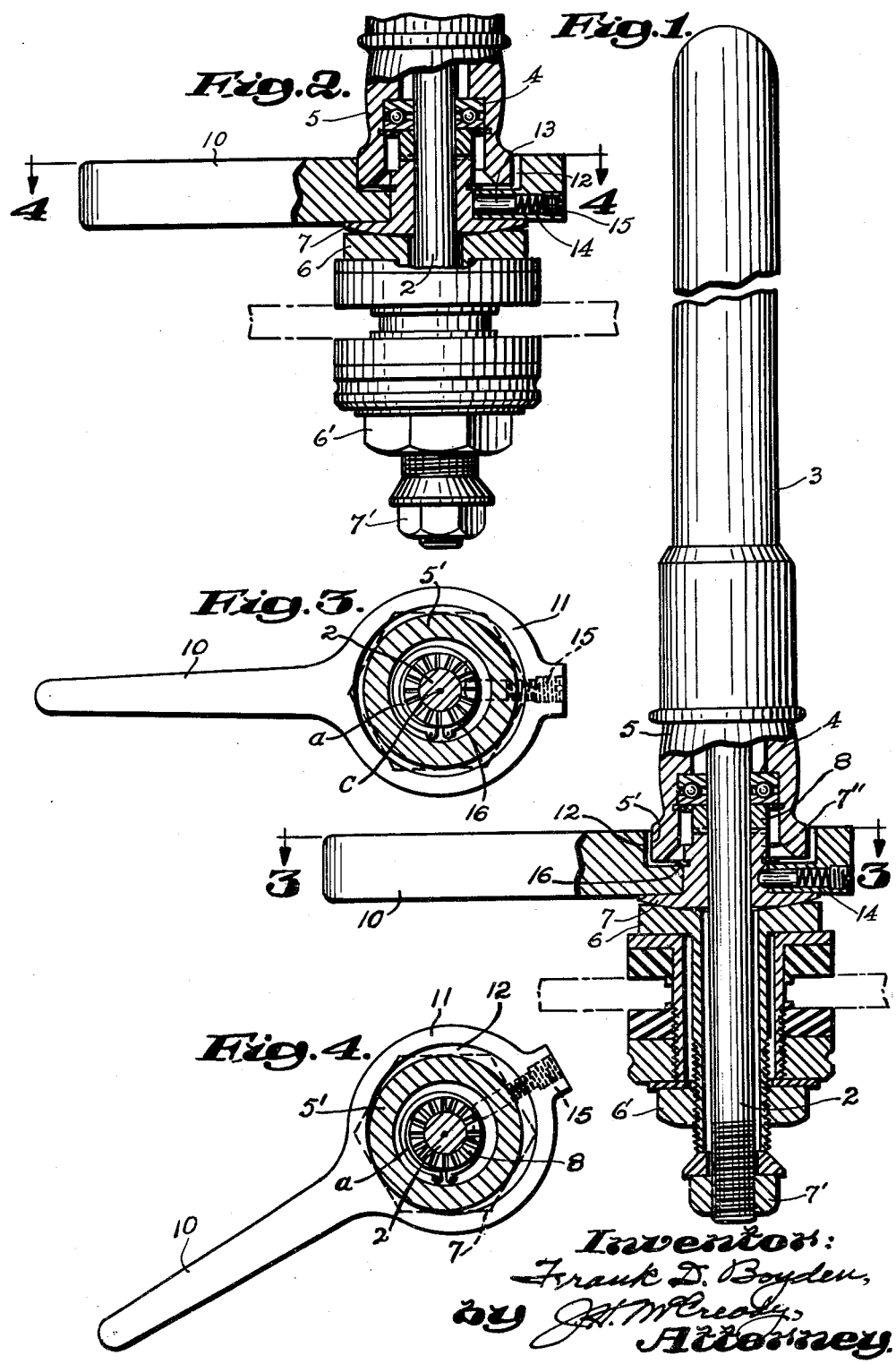
Inventor:
Frank D. Boyden,
by J. H. McCready,
Attorney.

Patented Dec. 5, 1950

2,533,162

UNITED STATES PATENT OFFICE 2,533,162

SPINDLE BRAKE

Frank D. Boyden, South Portland, Maine, assignor to Saco-Lowell Shops, Boston, Mass., a corporation of Maine Application September 1, 1949, Serial No. 113,507

8 Claims. (Cl. 57—88)

1

This invention relates to brake mechanisms for spindles and more especially to those used in spinning and twister frames.

While numerous forms of spindle brakes have heretofore been devised, it is still the common practice for the operators of spinning and twister frames to stop a spindle simply by holding a hand against it. With the present tendencies to use larger and heavier yarn packages and larger spindles operating at higher speeds, there is a real need for a spindle brake which will satisfy the practical requirements of the operators in using spindles of these more modern types. This involves not only stopping the spindle quickly but also holding it stationary while leaving the operator entirely free to attend to piecing up.

The present invention aims to devise a spindle brake which will meet these conditions, and it is directed more especially to producing an exceptionally simple brake construction which will be easy to operate, can readily be kept clean, and which will be reasonable in expense.

The nature of the invention will be readily understood from the following description when read in connection with the accompanying drawings, and the novel features will be particularly pointed out in the appended claims.

In the drawings,

Fig. 1 is a view, partly in elevation and partly in vertical section, illustrating a spindle equipped with a brake mechanism embodying this invention and showing the brake released;

Fig. 2 is a view illustrating, in elevation, certain of the parts shown in section in Fig. 1 and showing the brake in position to stop the spindle; and Figs. 3 and 4 are sectional views taken approximately on the line 3—3 of Fig. 1 and the line 4—4 of Fig. 2, respectively.

Referring first to Figs. 1 and 2, the construction there shown comprises a stationary spindle blade 2 mounted in a spindle base of a common form such, for example, as that shown in United States Patent No. 2,304,370.

In this construction the blade 2 is a "dead" spindle, that is, it is mounted in a fixed position and does not rotate, but the rotary element of the spindle is the sleeve 3 which is supported on the spindle blade by upper and lower ball bearings, the latter of these bearings being shown at 4. The sleeve 3 also includes a whirl 5 integral with it.

In the particular construction here shown, the spindle base includes a supplemental base

2 member 6, the upper surface of which is concaved and forms a stationary seat for the spindle stand 7. Both these parts 6 and 7 are of hexagonal outline to take a wrench for turning the nuts 6' and 7', respectively, by means of which they are tightened in place.

As above indicated, it is necessary to hold the spindle blade 2 in a stationary and fixed position. For this purpose a collar 8 is pressed, shrunk, or otherwise secured in a stationary position on the blade and it is provided on its lower end with radial grooves and teeth which fit between corresponding elements of the same character on the upper end face of the tubular hub 7" of the stand 7. When the nut 7' is tightened up it pulls the blade 2 down; compresses all of the parts of the base assembly through which pressure is transmitted from the collar 8, and thus locks the blade, the spindle stand, and the other parts securely together.

The brake structure provided by this invention comprises a handle or lever 10 having a flat disk or head 11 in the upper side of which a cylindrical cavity 12 is machined. Through the bottom of this cavity a hole is bored to fit the hub 7" of the stand 7, this hub forming a bearing post or pivot on which the lever 10 can be swung about the blade 2. The inner wall of this cavity or recess 12 forms the brake shoe of the present brake structure, and it is positioned to act on the outer surface of the skirt 5' of the spindle whirl. This surface is concentric with the spindle blade 2 as is also the collar 8 and the upper end portion of the hub 7" which cooperates with that collar. This normally is also true of the friction surface 12 of the brake shoe. However, that portion of the hub 7" on which the lever 10—11 swings is eccentric, its center being offset slightly to the left, Fig. 3, of the spindle axis C. The outline of this member 7" is shown in plan at a, Fig. 3, and its maximum eccentricity is in the median vertical plane of the lever 10. This eccentricity need not be great but, in the ordinary spindle it may be, for example, in the neighborhood of forty-five thousandths of an inch. Consequently, when the lever 10, Fig. 3, is swung in a counterclockwise direction into the position shown in Fig. 4, the inner wall of the cavity 12 will, due to the eccentric relationship of the parts above described, come into contact with the outer cylindrical surface of the skirt 5' of the spindle whirl and thus will apply a braking action to the whirl and the sleeve 3 with which it revolves. This braking effect can easily be made ample to stop the spindle in a few seconds. In the drawings the eccentricity has been exaggerated, simply for purposes of illustration. Because it is relatively small, a long area of contact of the brake shoe, namely the wall surface of the lever cavity, is brought into contact with a long area of the skirt of the whirl, and a very effective braking action, accordingly, is applied to the rotating element of the spindle.

When the lever is swung back into its initial or normal position, as shown in Fig. 3, its braking surface is moved in to approximately concentric relation to the whirl and the clearance which is normally provided between these surfaces is again established, thus restoring the spindle to its free running condition.

However, the brake, when set, will hold the whirl stationary against the tractive force exerted on it by the driving tape until it is again released by the operator.

It is desirable to hold the lever 10 normally in its non-braking or idle position, and for this purpose a plunger 13 is mounted slidably in a hole drilled axially in the end of the head 11 of the lever, and in the longitudinal median plane of the latter. A spring 14 bears on the outer end of this plunger and is backed up by a screw 15, by means of which the pressure of the spring can be adjusted. The rounded inner end of this plunger rests in a socket formed to receive it in the surface of the hub 7" and the wall of this socket is cut away at the upper side, as shown in dotted lines in Fig. 3, so that the lever may be easily moved in a counter-clockwise direction but is prevented from swinging in the opposite or clockwise direction.

Preferably a flat snap ring 16, Figs. 1 and 3, fits releasably into a groove in the hub 7" and thus holds the head of the lever down against the upper surface of the head of the spindle stand 7.

From the foregoing it will now be evident that the invention provides a spindle brake which is exceedingly simple in construction, is thoroughly reliable in operation, and which can be produced economically because all of the surfaces which require machining are cylindrical or circular surfaces.

While the invention has been herein disclosed as embodied in a spindle of the revolving sleeve type, it is obvious that the invention is equally applicable to a spindle of the revolving blade type. Such a spindle has a whirl and a skirt with which the brake shoe 11 can be associated in essentially the same manner that it cooperates with the skirt 5' of the spindle illustrated in the drawings. Consequently, it will be evident that the invention is susceptible of embodiment in other forms than that shown without departing from the spirit or scope thereof.

Having thus described my invention, what I desire to claim as new is:

1. A spindle brake comprising a brake shoe encircling a part of the revolving element of said spindle, means supporting said shoe for swinging movement around the axis of the spindle, said brake shoe having a surface operable to engage said revolving element when swung through a predetermined angle and to release said part when returned to its normal position, and an operating member for said brake shoe.

2. A brake for stopping the revolving element of a textile spindle comprising a brake member encircling said element, means supporting said brake member for swinging movement about a center positioned in the spindle blade, said brake member having a circular surface eccentric to said revolving element and so related thereto that said swinging movement in one direction brings the braking surface of said member into contact with said element and a swinging movement in the opposite direction disengages said member from said element.

3. A spindle brake comprising a brake shoe encircling a portion of the spindle whirl, means supporting said brake shoe for pivotal movement about an axis parallel to but offset laterally from the axis of said spindle, and a device operable to swing said shoe about its axis to bring a portion of the shoe into frictional engagement with a part of the spindle whirl.

4. A spindle brake according to preceding claim 3, including means for normally holding said brake shoe releasably in its idle or non-braking relationship to said whirl.

5. A spindle brake comprising a brake shoe encircling a portion of the spindle whirl, a spindle stand on which said brake shoe is mounted for rotative movement about an axis parallel to but spaced laterally from the axis of said whirl, and a handle connected with said brake shoe and operable to swing said shoe into and out of contact with the skirt of said whirl.

6. A brake for the whirl of a textile spindle comprising a brake shoe closely encircling the skirt of said whirl, a spindle stand on which said member is mounted for rotative movement about an axis parallel to that of said whirl but spaced laterally from it whereby such rotative movement in one direction will carry the brake shoe into contact with a circumferential surface of said whirl and its movement in the opposite direction will interrupt said contact.

7. A brake member for a textile spindle comprising a disk having a shallow cylindrical cavity therein, the wall of which forms a brake shoe adapted to encircle the skirt of a spindle whirl, said disk having a hole therethrough to receive a pivot on which said member can swing.

8. A brake member for a textile spindle comprising a disk having a shallow cylindrical cavity therein, the wall of which forms a brake shoe adapted to encircle the skirt of a spindle whirl, said disk having a hole therethrough eccentric to said shoe to receive a pivot post adapted to support said member for swinging movement about an axis eccentric to the axis of the friction surface of said shoe.

FRANK D. BOYDEN.

REFERENCES CITED

The following references are of record in the file of this patent:

UNITED STATES PATENTS

| Number | Name | Date |
| --- | --- | --- |
| 2,333,047 | Schlums | Oct. 26, 1943 |